(12) United States Patent
Kim et al.

(10) Patent No.: US 10,770,694 B2
(45) Date of Patent: Sep. 8, 2020

(54) PRISMATIC BATTERY CELL HAVING TWO OR MORE CASE MEMBERS

(71) Applicant: LG CHEM, LTD., Seoul (KR)

(72) Inventors: Ki Tae Kim, Daejeon (KR); Hyung Ku Yun, Daejeon (KR); Dong-Myung Kim, Daejeon (KR); Hyojin Kim, Daejeon (KR)

(73) Assignee: LG Chem, Ltd. (KR)

( * ) Notice: Subject to any disclaimer, the term of this patent is extended or adjusted under 35 U.S.C. 154(b) by 129 days.

(21) Appl. No.: 15/502,875

(22) PCT Filed: Sep. 22, 2015

(86) PCT No.: PCT/KR2015/009937
§ 371 (c)(1),
(2) Date: Feb. 9, 2017

(87) PCT Pub. No.: WO2016/048002
PCT Pub. Date: Mar. 31, 2016

(65) Prior Publication Data
US 2017/0237045 A1 Aug. 17, 2017

(30) Foreign Application Priority Data
Sep. 25, 2014 (KR) .................. 10-2014-0128103

(51) Int. Cl.
*H01M 2/02* (2006.01)
*H01M 10/04* (2006.01)
(Continued)

(52) U.S. Cl.
CPC ....... *H01M 2/0245* (2013.01); *H01M 2/0217* (2013.01); *H01M 2/0426* (2013.01);
(Continued)

(58) Field of Classification Search
CPC ......... H01M 10/0436; H01M 10/0459; H01M 10/0525; H01M 10/0583; H01M 2220/10;
(Continued)

(56) References Cited

U.S. PATENT DOCUMENTS

2004/0234846 A1* 11/2004 Han ...................... H01M 2/263
429/163
2005/0208345 A1* 9/2005 Yoon .................... H01M 2/0434
429/7
(Continued)

FOREIGN PATENT DOCUMENTS

| CN | 2416613 Y | 1/2001 |
| CN | 1363121 A | 8/2002 |

(Continued)

OTHER PUBLICATIONS

Extended European Search Report, dated Oct. 16, 2017, for European Application No. 15843664.2.
(Continued)

*Primary Examiner* — Adam A Arciero
(74) *Attorney, Agent, or Firm* — Lerner, David, Littenberg, Krumholz & Mentlik, LLP (57) ABSTRACT

Disclosed herein is a prismatic battery cell including an electrode assembly including a positive electrode, a negative electrode, and a separator disposed between the positive electrode and the negative electrode, the electrode assembly having a positive electrode terminal and a negative electrode terminal protruding from at least one side of the positive electrode and the negative electrode, two or more case members coupled to each other so as to have a shape corresponding to the external shape of the electrode assembly such that the case members surround the electrode assembly, the case members having a predetermined opening, through which one surface of the electrode assembly, at least, corresponding to protruding portions of the positive
(Continued)

electrode terminal and the negative electrode terminal is exposed, and a cap plate coupled to the opening of the case members in a sealed state.

22 Claims, 9 Drawing Sheets

(51) Int. Cl.
    *H01M 2/04* (2006.01)
    *H01M 2/06* (2006.01)
    *H01M 2/30* (2006.01)
    *H01M 10/0525* (2010.01)
    *H01M 10/0583* (2010.01)

(52) U.S. Cl.
    CPC ....... *H01M 2/0439* (2013.01); *H01M 2/0473* (2013.01); *H01M 2/06* (2013.01); *H01M 2/305* (2013.01); *H01M 10/0436* (2013.01); *H01M 10/0459* (2013.01); *H01M 10/0525* (2013.01); *H01M 10/0583* (2013.01); *H01M 2/0486* (2013.01); *H01M 2220/10* (2013.01); *H01M 2220/20* (2013.01); *H01M 2220/30* (2013.01); *Y02T 10/7011* (2013.01)

(58) Field of Classification Search
    CPC ......... H01M 2220/20; H01M 2220/30; H01M 2/0217; H01M 2/0245; H01M 2/0426; H01M 2/0439; H01M 2/0473; H01M 2/0486; H01M 2/06; H01M 2/305
    See application file for complete search history.

(56) References Cited

U.S. PATENT DOCUMENTS

| | | | |
|---|---|---|---|
| 2006/0068281 A1* | 3/2006 | Hiratsuka | H01M 2/1061 429/185 |
| 2006/0127756 A1* | 6/2006 | Seo | H01M 2/021 429/175 |
| 2008/0176134 A1* | 7/2008 | Kim | H01M 2/021 429/175 |
| 2011/0076555 A1 | 3/2011 | Jeong | |
| 2011/0143193 A1* | 6/2011 | Ahn | H01M 2/0404 429/176 |
| 2011/0183181 A1 | 7/2011 | Moon et al. | |
| 2014/0011070 A1 | 1/2014 | Kim et al. | |
| 2014/0120394 A1* | 5/2014 | Kwon | H01M 10/0463 429/94 |
| 2014/0255740 A1 | 9/2014 | Han et al. | |
| 2015/0340662 A1 | 11/2015 | Kwon et al. | |
| 2015/0340733 A1 | 11/2015 | Kwon et al. | |
| 2016/0254501 A1 | 9/2016 | Saimaru et al. | |

FOREIGN PATENT DOCUMENTS

| | | |
|---|---|---|
| CN | 1770499 A | 5/2006 |
| CN | 1898819 A | 1/2007 |
| CN | 2881973 Y | 3/2007 |
| CN | 201229955 Y | 4/2009 |
| CN | 202127063 U | 1/2012 |
| CN | 204966551 U | 1/2016 |
| EP | 3024052 A1 | 5/2016 |
| JP | 63-269450 A | 11/1988 |
| JP | 2002-198011 A | 7/2002 |
| JP | 2012-84247 A | 4/2012 |
| JP | 2012-174433 A | 9/2012 |
| JP | 2014-59954 A | 4/2014 |
| JP | 2015-536530 A | 12/2015 |
| KR | 10-2006-0102249 A | 9/2006 |
| KR | 10-2008-0005629 A | 1/2008 |
| KR | 10-2008-0068387 A | 7/2008 |
| KR | 10-1036089 B1 | 5/2011 |
| KR | 10-2011-0066448 A | 6/2011 |
| KR | 10-1073313 A | 10/2011 |
| KR | 10-2013-0080258 A | 7/2013 |
| KR | 10-2014-0102385 A | 8/2014 |
| KR | 10-2014-0109674 A | 9/2014 |
| WO | WO 2014/126338 A1 | 8/2014 |
| WO | WO 2015/072010 A1 | 5/2015 |

OTHER PUBLICATIONS

International Search Report issued in PCT/KR2015/009937 (PCT/ISA/210), dated Nov. 11, 2015.

* cited by examiner

PRISMATIC BATTERY CELL HAVING TWO OR MORE CASE MEMBERS

TECHNICAL FIELD

The present invention relates to a prismatic battery cell including two or more case members.

This application claims the benefit of Korean Patent Application No. 10-2014-0128103 filed on Sep. 25, 2014 with the Korean Intellectual Property Office, the disclosure of which is herein incorporated by reference in its entirety.

BACKGROUND ART

As energy prices are increasing due to depletion of fossil fuels and interest in environmental pollution is escalating, the demand for environmentally-friendly alternative energy sources is bound to play an increasing role in the future. Thus, research into techniques for generating various powers, such as nuclear energy, solar energy, wind energy, and tidal power, is underway, and power storage apparatuses for more efficient use of the generated energy are also drawing much attention.

In particular, the demand for batteries as energy sources is rapidly increasing as mobile device technology continues to develop and the demand for the mobile devices continues to increase. Accordingly, much research on batteries satisfying various needs has been carried out.

In terms of the shape of batteries, the demand for prismatic secondary batteries or pouch-shaped secondary batteries, which are thin enough to be applied to products, such as mobile phones, is very high. In terms of the material for batteries, on the other hand, the demand for lithium secondary batteries, such as lithium ion batteries and lithium ion polymer batteries, which exhibit high energy density, discharge voltage, and output stability, is very high.

In addition, secondary batteries may be classified based on the structure of an electrode assembly having a structure in which a positive electrode and a negative electrode are stacked in a state in which a separator is interposed between the positive electrode and the negative electrode. For example, the electrode assembly may be configured to have a jelly-roll (wound) type structure in which a long sheet type positive electrode and a long sheet type negative electrode are wound in a state in which a separator is disposed between the positive electrode and the negative electrode or a stacked type structure in which pluralities of positive electrodes and negative electrodes each having a predetermined size are sequentially stacked in a state in which separators are disposed respectively between the positive electrodes and the negative electrodes. In recent years, in order to solve problems caused by the jelly-roll type electrode assembly and the stacked type electrode assembly, there has been developed a stacked/folded type electrode assembly, which is a combination of the jelly roll type electrode assembly and the stacked type electrode assembly, having an improved structure in which predetermined numbers of positive electrodes and negative electrodes are sequentially stacked in a state in which separators are disposed respectively between the positive electrodes and the negative electrodes to constitute a unit cell, and then a plurality of unit cells is sequentially folded while being placed on a separation film.

In addition, secondary batteries may be classified into a cylindrical battery configured to have a structure in which an electrode assembly is mounted in a cylindrical metal container, a prismatic battery configured to have a structure in which an electrode assembly is mounted in a prismatic metal container, and a pouch-shaped battery configured to have a structure in which an electrode assembly is mounted in a pouch-shaped case made of an aluminum laminate sheet based on the shape of the battery case of each of the secondary batteries.

Particularly, in recent years, much interest has been taken in a pouch-shaped battery configured to have a structure in which such a stacked or stacked/folded type electrode assembly is mounted in a pouch-shaped battery case made of an aluminum laminate sheet because of low manufacturing costs, light weight, easy modification in shape, etc. In addition, the use of such a pouch-shaped battery has gradually increased.

Figure 1:
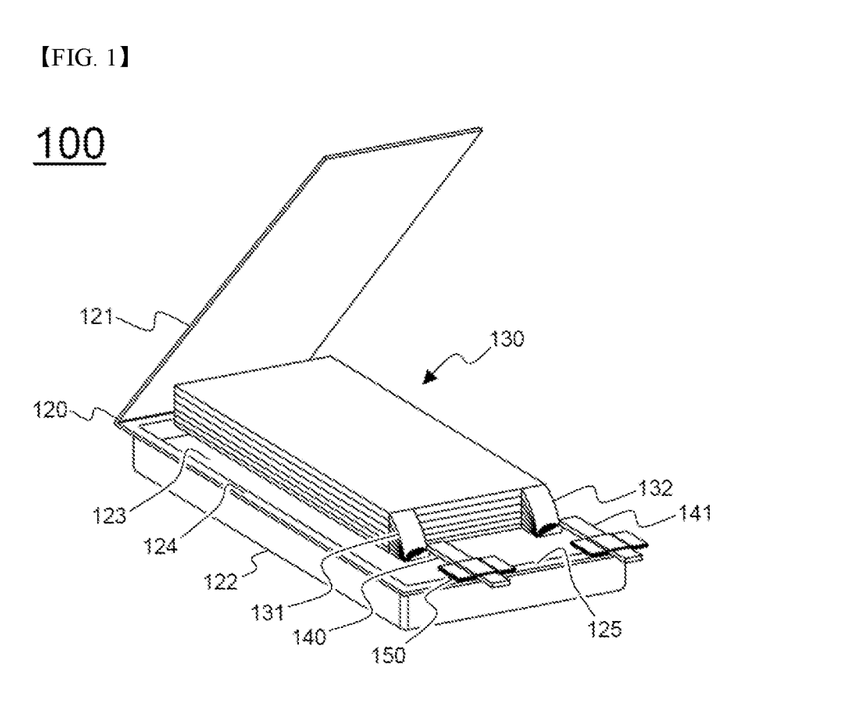
FIG. 1 is an exploded perspective view showing a general structure of a conventional pouch-shaped secondary battery.

FIG. 1 is an exploded perspective view typically showing a general structure of a conventional representative pouch-shaped secondary battery.

Referring to FIG. 1, a pouch-shaped secondary battery 100 includes an electrode assembly 130, electrode tabs 131 and 132 extending from the electrode assembly 130, electrode leads 140 and 141 connected respectively to the electrode tabs 131 and 132 by welding, and a battery case 120 for receiving the electrode assembly 130.

The electrode assembly 130 is a power generating element including positive electrodes and negative electrodes sequentially stacked in a state in which separators are disposed respectively between the positive electrodes and the negative electrodes. The electrode assembly 130 is configured to have a stacked type structure or a stacked/folded type structure. The electrode tabs 131 and 132 extend from corresponding electrode plates of the electrode assembly 130. The electrode leads 140 and 141 are electrically connected to the electrode tabs 131 and 132, extending from the corresponding electrode plates of the electrode assembly 130, respectively, for example, by welding. The electrode leads 140 and 141 are partially exposed outward from the battery case 120. In addition, insulating films 150 for improving sealability between the battery case 120 and the electrode leads 140 and 141 and, at the same time, securing electrical insulation between the battery case 120 and the electrode leads 140 and 141 are partially attached to the upper and lower surfaces of the electrode leads 140 and 141.

The battery case 120 includes a case body 122 having a concave receiving part 123, in which the electrode assembly 130 is mounted, and a cover 121 integrally connected to the case body 122. In a state in which the electrode assembly 130 is mounted in the receiving part 123, opposite sides 124 and upper ends 125 of the case body 122 and the cover 121, at which the case body 122 and the cover 121 contact each other, are coupled to the each other, whereby the battery is completed. The battery case 120 is configured to have an aluminum laminate structure of a resin layer/metal foil layer/resin layer. Consequently, it is possible to bond the opposite sides 124 and the upper ends 125 of the case body 122 and the cover 121, which are in contact with each other, to each other by applying heat and pressure to the opposite sides 124 and the upper ends 125 of the case body 122 and the cover 121 so as to bond the resin layers thereof to each other, whereby sealed surplus portions are formed. At the opposite sides 124 of the case body 122 and the cover 121, the resin layers of the upper and lower parts of the battery case 120 are directly attached to each other, whereby uniform sealing is achieved by bonding the opposite sides 124 of the case body 122 and the cover 121. On the other hand, the electrode leads 140 and 141 are located at the upper ends 125 of the case body 122 and the cover 121, while protruding outward from the battery case 120. For this reason, the upper ends 125 of the case body 122 and the cover 121 are thermally bonded in a state in which insulation films 150 are interposed between the electrode leads 140 and 141 and the battery case 120 in order to improve sealability considering the thickness of the electrode leads 140 and 141 and the difference in material between the electrode leads 140 and 141 and the battery case 120.

The pouch-shaped secondary battery has an advantage in that the shape of the battery case can be easily modified depending upon the shape of the electrode assembly. However, the pouch-shaped secondary battery has problems in that the secondary battery may not be sufficiently protected when external impart is applied thereto due to low rigidity thereof, and, in particular, the secondary battery may be easily damaged due to a needle-shaped member, whereby the secondary battery may deteriorate and explode.

In addition, when a short circuit may occur in the secondary battery due to the exposure of the secondary battery to a high-temperature environment or the malfunction of the secondary battery, an electrolyte may be decomposed at positive electrode interfaces, whereby a large amount of gas is generated. As a result, the secondary battery may swell, which may damage the electrical connection of the secondary battery.

Furthermore, the pouch-shaped secondary battery has another problem in that the capacity of the secondary battery is reduced due to the sealed surplus portions formed during sealing of the battery case.

In order to solve the above problem, a prismatic battery cell configured having a structure in which a stacked type or stacked/folded type electrode assembly is mounted in a prismatic metal battery case has been considered as a substitute in recent years.

In general, the prismatic battery cell is manufactured by inserting an electrode assembly into a prismatic hollow case having a closed lower end, coupling a top cap assembly to the case by welding, injecting an electrolyte into the case through an injection hole, and sealing the injection hole. The prismatic hollow case having the closed lower end is generally manufactured by deep drawing of an aluminum alloy sheet.

However, deep drawing has problems in that costs necessary to manufacture an apparatus for deep drawing are very high, it takes long time to manufacture a mold, etc., and obtainable shapes are limited.

Therefore, there is a high necessity for technology that is capable of fundamentally solving the above problems.

DISCLOSURE

Technical Problem

The present invention has been made to solve the above problems and other technical problems that have yet to be resolved.

As a result of a variety of extensive and intensive studies and experiments to solve the problems as described above, the inventors of the present application have found that, in a case in which a battery case is constituted by two or more case members, coupled to each other so as to surround an electrode assembly in response to the external shape of the electrode assembly, and a cap plate, as will hereinafter be described, it is possible to improve overall rigidity of a battery cell, to improve the safety of the battery cell against external physical impact, and to prevent the battery cell from being deformed due to gas generated in the battery cell, whereby it is possible to improve the safety of the battery cell and a device, to which the battery cell is applied, to variously design the battery cell without limitations in shape, to reduce cost and time necessary to manufacture the battery cell, thereby improving production efficiency and reducing a product defect rate. The present invention has been completed based on these findings.

Technical Solution

In accordance with one aspect of the present invention, the above and other objects can be accomplished by the provision of a prismatic battery cell including an electrode assembly including a positive electrode, a negative electrode, and a separator disposed between the positive electrode and the negative electrode, the electrode assembly having a positive electrode terminal and a negative electrode terminal protruding from at least one side of the positive electrode and the negative electrode, two or more case members coupled to each other so as to have a shape corresponding to the external shape of the electrode assembly such that the case members surround the electrode assembly, the case members having a predetermined opening, through which one surface of the electrode assembly, at least, corresponding to protruding portions of the positive electrode terminal and the negative electrode terminal is exposed, and a cap plate coupled to the opening of the case members in a sealed state.

As described above, the prismatic battery cell according to the present invention is configured such that the battery case is constituted by the two or more case members and the cap plate. Consequently, it is possible to improve the safety of the battery cell against external physical impact and to prevent the battery cell from being deformed due to gas generated in the battery cell, whereby it is possible to improve overall safety of the battery cell. In addition, it is possible to variously design the battery cell, to reduce cost and time necessary to manufacture the battery cell, and to reduce a product defect rate.

In a concrete example, the electrode assembly may be configured to have a structure in which unit cells, each of which is configured to have a stacked structure including a positive electrode, a negative electrode, and a separator disposed between the positive electrode and the negative electrode, are successively folded using a separation film. However, the present invention is not limited thereto. The structure of the electrode assembly is not particularly restricted so long as the electrode assembly is stably surrounded by the two or more case members and the cap plate.

In addition, the positive electrode terminal and the negative electrode terminal may protrude from the same side of the electrode assembly.

The prismatic battery cell is generally configured to have a structure in which the positive electrode terminal and the negative electrode terminal protrude from the same side of the electrode assembly. As a result, a device, to which the prismatic battery cell is applied, is also configured such that a positive electrode and a negative electrode are connected to the same side of the prismatic battery cell.

If the positive electrode terminal and the negative electrode terminal protrude from different sides of the electrode assembly, it is necessary to provide an additional member, such as an electrode lead, for guiding one of the electrode terminals, i.e. the positive electrode terminal or the negative electrode terminal, to the other of the electrode terminals. The additional member is mounted in the battery case together with the electrode assembly. As a result, the prismatic battery cell configured such that the positive electrode terminal and the negative electrode terminal protrude from different sides of the electrode assembly may have a smaller capacity than the prismatic battery cell configured such that the positive electrode terminal and the negative electrode terminal may protrude from the same side of the electrode assembly.

Consequently, the prismatic battery cell according to the present invention may be configured to have a structure in which the positive electrode terminal and the negative electrode terminal may protrude from the same side of the electrode assembly.

In this case, the case members may be coupled to each other so as to have a structure in which the case members surround the other surfaces of the electrode assembly such that the case members have one opening, through which one surface of the electrode assembly corresponding to the protruding portions of the positive electrode terminal and the negative electrode terminal are exposed. Alternatively, the case members may be coupled to each other so as to have a structure in which the case members surround the other surfaces of the electrode assembly such that the case members have two openings, through which one surface of the electrode assembly corresponding to the protruding portions of the positive electrode terminal and the negative electrode terminal and another surface of the electrode assembly opposite to one surface of the electrode assembly are exposed.

The cap plate may be coupled to the opening or each opening of the case members, and the cap plate coupled to one surface of the electrode assembly corresponding to the protruding portions of the positive electrode terminal and the negative electrode terminal may be electrically connected to the positive electrode terminal and the negative electrode terminal of the electrode assembly.

That is, the case members may be coupled to each other so as to have a structure in which the case members surround the other surfaces of the electrode assembly such that the case members have openings, through which one surface of the electrode assembly, at least, corresponding to the protruding portions of the positive electrode terminal and the negative electrode terminal is exposed, and another surface of the electrode assembly opposite to one surface of the electrode assembly is selectively exposed.

In addition, the cap plate, coupled to the opening of the case members at one surface of the electrode assembly corresponding to the protruding portions of the positive electrode terminal and the negative electrode terminal, is electrically connected to the positive electrode terminal and the negative electrode terminal of the electrode assembly. Consequently, a positive electrode and a negative electrode for electrical connection with an external device may be easily formed at the same surface of the cap plate without the provision of an additional member, such as an electrode lead.

In a concrete example, the case members may be two case members having the same shape.

Consequently, it is possible to manufacture the case members through a signal process, thereby reducing cost necessary to manufacture products.

In another concrete example, the case members may be two case members having different shapes. In this case, a prismatic battery cell manufactured by coupling the case members may not have a shape symmetric with respect to one axis but may have an irregular outer shape.

Consequently, it is possible to manufacture battery cells having various designs by coupling the two case members having different shapes to each other.

In this case, the case members having the same shape or different shapes may be configured to entirely surround different surfaces of the electrode assembly or to partially surround the same surfaces of the electrode assembly.

In addition, each of the case members may be provided at at least one outer surface thereof with a step.

Consequently, the case members of the prismatic battery cell according to the present invention may be more easily applied to electrode assemblies having various outer surface structures, such as the step as described above.

Meanwhile, each of the case members may be manufactured by forging, blanking, or cutting a metal sheet.

In other words, a conventional prismatic battery cell includes a hollow prismatic case, having one opening, manufactured by deep drawing and a cap plate for covering the opening in a sealed state, whereas the prismatic battery cell according to the present invention is manufactured by coupling a plurality of case members manufactured by forging, blanking, or cutting a metal sheet and one or more cap plates.

Consequently, it is possible to variously design the battery cell without limitations in shape, to reduce cost and time necessary to manufacture the battery cell, thereby improving production efficiency. In addition, it is possible to reduce a product defect rate, which is high when deep drawing is used.

Meanwhile, the case members may be provided at coupling portions thereof with stair type steps.

In addition, the case members may be provided at coupling portions thereof coupled to the cap plate with stair type steps. Alternatively, the case members may be provided at coupling portions thereof coupled to the cap plate with stair type steps, and the cap plate may be provided at coupling portions thereof coupled to the case members with stair type steps.

The stair type steps may be formed at the coupling portions of the case members and the cap plate over relatively large area. Consequently, the case members and the cap plate may be more stably coupled to each other.

The coupling portions, at which the stair type steps are formed, may be configured to have a structure in which the coupling portions engage with each other.

Stronger coupling force may be applied to the coupling portions, at which the stair type steps are formed. When external physical impact is applied to the case members and the cap plate, therefore, the coupling portions of the case members and the cap plate are prevented from being separated from each other.

In addition, a method of achieving coupling between the case members and coupling between the case members and the cap plate is not particularly restricted so long as coupling between the case members and coupling between the case members and the cap plate can be stably achieved. Specifically, coupling between the case members and coupling between the case members and the cap plate may be achieved by laser welding.

In a concrete example, the prismatic battery cell may be configured to have a structure in which the case members are coupled to each other so as to surround the other surfaces of the electrode assembly in a state in which the positive electrode terminal and the negative electrode terminal of the electrode assembly are electrically connected to the cap plate.

That is, the positive electrode terminal and the negative electrode terminal of the electrode assembly may be electrically connected to the cap plate, and then the case members are coupled to each other so as to surround the other surfaces of the electrode assembly.

Consequently, the positive electrode terminal and the negative electrode terminal of the electrode assembly may be exposed with the result that the positive electrode terminal and the negative electrode terminal may be more easily connected to the cap plate.

Meanwhile, the kind of the prismatic battery cell according to the present invention is not particularly restricted. In a concrete example, the prismatic battery cell may be a lithium secondary battery, such as a lithium ion battery or a lithium ion polymer battery, which exhibit high energy density, discharge voltage, and output stability.

In general, a lithium secondary battery includes a positive electrode, a negative electrode, a separator, and a non-aqueous electrolytic solution containing lithium salt.

The positive electrode may be manufactured, for example, by applying a mixture of a positive electrode active material, a conductive agent, and a binder to a positive electrode current collector and drying the mixture. A filler may be further added to the mixture as needed.

The positive electrode active material may be, but is not limited to, a layered compound, such as a lithium cobalt oxide ($LiCoO_2$) or a lithium nickel oxide ($LiNiO_2$), or a compound replaced by one or more transition metals; a lithium manganese oxide represented by a chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiFe_3O_4$, $V_2O_5$, or $Cu_2V_2O_7$; an Ni-sited lithium nickel oxide represented by a chemical formula $LiNi_{1-x}M_xO_2$ (where M=Co, Mn, Al, Cu, Fe, Mg, B, or Ga, and x=0.01 to 0.3); a lithium manganese composite oxide represented by a chemical formula $LiMn_{2-x}M_xO_2$ (where M=Co, Ni, Fe, Cr, Zn, or Ta, and x=0.01 to 0.1) or a chemical formula $Li_2Mn_3MO_8$ (where M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conductive agent is generally added so that the conductive agent has 1 to 30 weight % based on the total weight of the compound including the positive electrode active material. The conductive agent is not particularly restricted so long as the conductive agent exhibits high conductivity while the conductive agent does not induce any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or conductive materials, such as polyphenylene derivatives may be used as the conductive agent.

The binder is a component assisting in binding between the active material and conductive agent and in binding with the current collector. The binder is generally added in an amount of 1 to 30 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler so long as it does not cause chemical changes in a battery to which the filler is applied and is made of a fibrous material. As examples of the filler, there may be used olefin polymers, such as polyethylene and polypropylene; and fibrous materials, such as glass fiber and carbon fiber.

On the other hand, the negative electrode may be manufactured by applying and drying a negative electrode active material to a negative electrode current collector. The above-described components may be selectively added to the negative electrode active material as needed.

As the negative electrode active material, for example, there may be used carbon, such as non-graphitizing carbon or a graphite-based carbon; a metal composite oxide, such as $Li_xFe_2O_3$ (0≤x≤1), $Li_xWO_2$ (0≤x≤1), $Sn_xMe_{1-x}Me'_yO_z$ (Me: Mn, Fe, Pb, Ge; Me': Al, B, P, Si, Group 1, 2 and 3 elements of the periodic table, halogen; 0≤x≤1; 1≤y≤3; 1≤z≤8); lithium metal; lithium alloy; silicon-based alloy; tin-based alloy; metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; conductive polymer, such as polyacetylene; or a Li—Co—Ni based material.

The separator and the separation film are interposed between the positive electrode and the negative electrode. As the separator and the separation film, for example, an insulative thin film exhibiting high ion permeability and high mechanical strength may be used. The separator generally has a pore diameter of 0.01 to 10 μm and a thickness of 5 to 300 μm. As the material for the separator, for example, a sheet or non-woven fabric made of olefin polymer, such as polypropylene, which exhibits chemical resistance and hydrophobicity, glass fiber, or polyethylene is used. In a case in which a solid electrolyte, such as polymer, is used as an electrolyte, the solid electrolyte may also function as the separator.

In addition, in a concrete example, the separator and/or the separation film may be organic/inorganic composite porous safety reinforcing separator (SRS) for improving the safety of the battery.

The SRS separator may be manufactured by applying inorganic particles and a binder polymer, as active layer components, to a polyolefin separator base. In addition to a porous structure included in separator base, a uniform porous structure may be formed due to interstitial volumes among the inorganic particles, as the active layer component.

In a case in which the organic/inorganic composite porous separator is used, it is possible to restrain the increase in thickness of the battery due to swelling at the time of formation as compared with a case in which a normal separator is used. In addition, in a case in which a polymer that can gel at the time of impregnating a liquid electrolytic solution is used as the binder polymer, the polymer may also be used as an electrolytic.

In addition, the organic/inorganic composite porous separator may exhibit excellent adhesive characteristics by adjusting the contents of the inorganic particles and the binder polymer, which are active layer components in the separator. Consequently, a battery assembly process may be easily carried out.

The inorganic particles are not particularly restricted so long as the inorganic particles are electrochemically stable. That is, the inorganic particles that can be used in the present invention are not particularly restricted so long as the inorganic particles are not oxidized and/or reduced within an operating voltage range (e.g. 0 to 5 V based on Li/Li+) of a battery to which inorganic particles are applied. In particular, in a case in which inorganic particles having ion conductivity are used, it is possible to improve ion conductivity in an electrochemical element, thereby improving the performance of the battery. Consequently, it is preferable that ion conductivity of the inorganic particles be as high as possible. In addition, in a case in which the inorganic particles have high density, it may be difficult to disperse the inorganic particles at the time of coating, and the weight of the battery may increase. For these reasons, it is preferable that density of the inorganic particles be as low as possible. Additionally, in a case in which the inorganic particles have high permittivity, a degree of dissociation of electrolyte salt, such as lithium salt, in a liquid electrolyte may increase, thereby improving ion conductivity of the electrolytic solution.

The non-aqueous electrolytic solution containing lithium salt is composed of a polar organic electrolytic solution and lithium salt. As the electrolytic solution, a non-aqueous liquid electrolytic solution, an organic solid electrolyte, or an inorganic solid electrolyte may be used.

As examples of the non-aqueous liquid electrolytic solution, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the above-mentioned non-aqueous electrolyte, and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolytic solution. According to circumstances, in order to impart incombustibility, the non-aqueous electrolytic solution may further include halogen-containing solvents, such as carbon tetrachloride and ethylene trifluoride. Furthermore, in order to improve high-temperature retention characteristics, the non-aqueous electrolytic solution may further include carbon dioxide gas.

In accordance with another aspect of the present invention, there is provided a method of manufacturing the prismatic battery cell with the above-stated construction, the method including (a) preparing unit cells, each of which is configured to have a stacked structure comprising at least one positive electrode, at least one negative electrode, and at least one separator disposed between the at least one positive electrode and the at least one negative electrode, (b) sequentially folding the unit cells prepared at step (a) in a state in which the unit cells are placed on a long sheet type separation film to prepare an electrode assembly, (c) electrically connecting a positive electrode terminal and a negative electrode terminal of the electrode assembly prepared at step (b) to a cap plate, and (d) coupling case members and the cap plate so as to surround the electrode assembly, the positive electrode terminal and the negative electrode terminal of which are electrically connected to the cap plate at step (c), injecting an electrolyte into the case members, and sealing the case members.

The unit cells may be configured such that the outermost electrodes of the unit cells having different polarities face each other in a state in which the separation film is disposed between the outermost electrodes of the unit cells.

Specifically, the outermost electrodes of the unit cells may have the same polarity or different polarities. The electrode assembly may be manufactured by placing the unit cells on the separation film such that the outermost electrodes of the unit cells having different polarities face each other in a state in which the separation film is disposed between the outermost electrodes of the unit cells having different polarities, and then continuously winding the separation film.

In addition, coupling between the case members and coupling between the case members and the cap plate may be achieved by laser welding such that the case members are more stably coupled to each other and such that the case members are more stably coupled to the cap plate.

Meanwhile, at step (d), the electrolyte may be injected into the case members in a state in which the case members are coupled to the cap plate, i.e. in a sealed state. Specifically, the electrolyte may be injected into the case members through an electrolyte injection hole formed in the cap plate.

In accordance with a further aspect of the present invention, there is provided a device including one or more prismatic battery cells with the above-stated construction. The device may be any one selected from a group consisting of a mobile phone, a tablet computer, a laptop computer, a power tool, a wearable electronic device, an electric vehicle, a hybrid electric vehicle, a plug-in hybrid electric vehicle, and a power storage apparatus.

The devices are well known in the art to which the present invention pertains, and therefore a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 2:
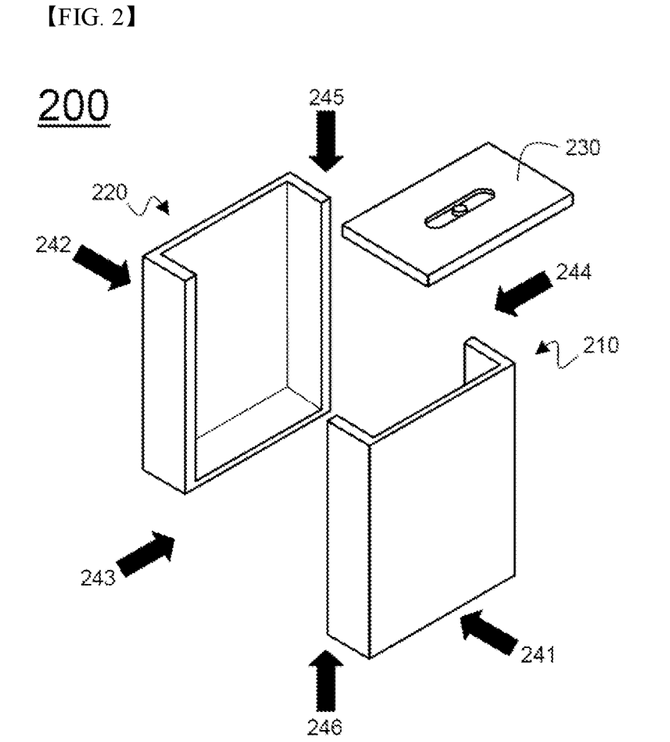
FIG. 2 is an exploded perspective view schematically showing the structure of a prismatic battery cell according to an embodiment of the present invention.

FIG. 2 is an exploded perspective view schematically showing the structure of a prismatic battery cell according to an embodiment of the present invention.

Referring to FIG. 2, a prismatic battery cell 200 includes two case members 210 and 220 and one cap plate 230.

The case members 210 and 220 include a first case member 210 and a second case member 220 having the same shape as the first case member 210. The case members 210 and 220 are coupled to each other so as to have a shape corresponding to the external shape of an electrode assembly (not shown) such that the case members 210 and 220 surround the electrode assembly. When the case members 210 and 220 are coupled to each other, the case members 210 and 220 have a predetermined opening, through which an upper end surface 245 of the prismatic battery cell 200 is exposed.

The first case member 210 and the second case member 220 entirely surround a front surface 241 and a rear surface 242 of the prismatic battery cell 200, respectively. In addition, the first case member 210 and the second case member 220 partially surround a left side surface 243, a right side surface 244, and a lower end surface 246 of the prismatic battery cell 200.

The cap plate 230 is coupled to the opening of the first case member 210 and the second case member 220, which is formed by coupling between the first case member 210 and the second case member 220, corresponding to the upper end surface 245 of the prismatic battery cell 200, in a sealed state.

Figure 3:
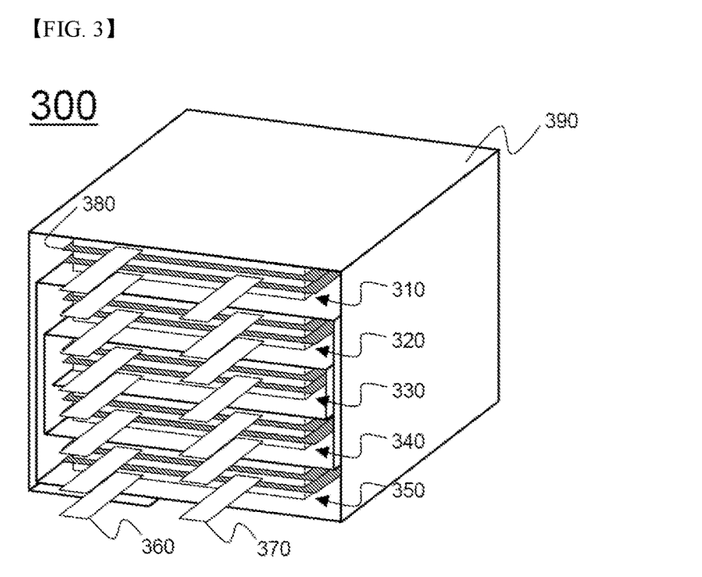
FIG. 3 is a typical view schematically showing the structure of an electrode assembly constituting the prismatic battery cell of FIG. 2.

FIG. 3 is a typical view schematically showing the structure of an electrode assembly constituting the prismatic battery cell of FIG. 2.

Referring to FIG. 3, an electrode assembly 300 is configured to have a structure in which a plurality of unit cells 310, 320, 330, 340, and 350 is sequentially folded in a state in which the unit cells 310, 320, 330, 340, and 350 are placed on a separation film 390.

In addition, each of the unit cells 310, 320, 330, 340, and 350 has a positive electrode terminal 360 protruding from one end of the outer edge of each positive electrode and a negative electrode terminal 370 protruding from one end of the outer edge of each negative electrode. The positive electrode terminal 360 and the negative electrode terminal 370 protrude from the same sides of the unit cells 310, 320, 330, 340, and 350.

When the case members 210 and 220 (see FIG. 2) are coupled to surround the electrode assembly 300, the positive electrode terminal 360 and the negative electrode terminal 370 are located in the opening of the case members 210 and 220, which is formed when the case members 210 and 220 are coupled to each other, and are electrically connected to the cap plate 230 (see FIG. 2).

Figure 4:
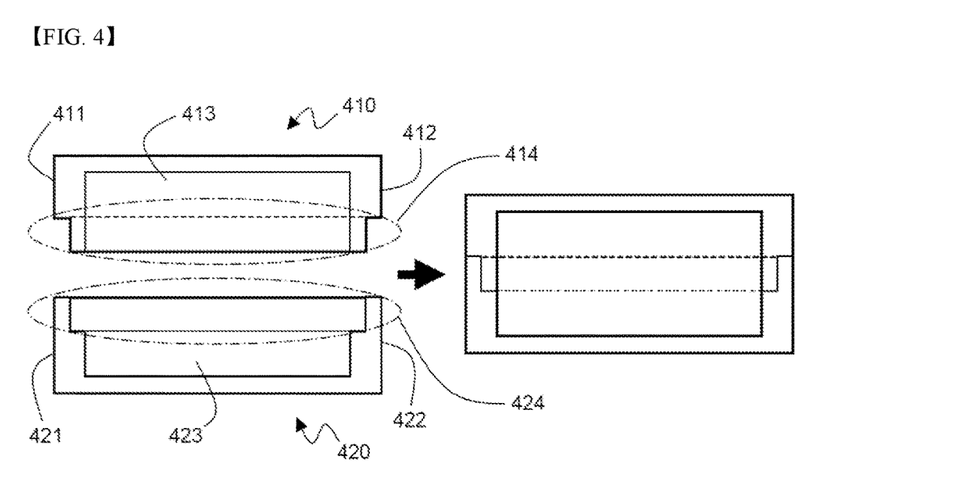
FIG. 4 is a plan view schematically showing a coupling structure between case members of a prismatic battery cell according to another embodiment of the present invention.

FIG. 4 is a plan view schematically showing a coupling structure between case members of a prismatic battery cell according to another embodiment of the present invention.

Referring to FIG. 4, case members 410 and 420 are provided at coupling portions 414 and 424 thereof with stair type steps, respectively.

The stair type steps are formed at the coupling portions 414 and 424 of the case members 410 and 420, by which the case members 410 and 420 are coupled to each other. Specifically, the coupling portions 414 and 424 are formed at left side walls 411 and 421, right side walls 412, and 422, and lower end walls 413 and 423 of the case members 410 and 420 such that the coupling portions 414 and 424 are convex and concave, respectively, such that the coupling portions 414 and 424 engage with each other.

Coupling between the case members 410 and 420 is achieved through the connection between the coupling portions 414 and 424, at which the stair type steps are formed, by laser welding.

The stair type steps are formed at the coupling portions 414 and 424 of the case members 410 and 420 over relatively large area. Consequently, the case members 410 and 420 are more stably coupled to each other. In addition, stronger coupling force is applied to the coupling portions 414 and 424. When external physical impact is applied to the case members 410 and 420, therefore, the coupling portions 414 and 424 of the case members 410 and 420 are prevented from being separated from each other.

Figure 5:
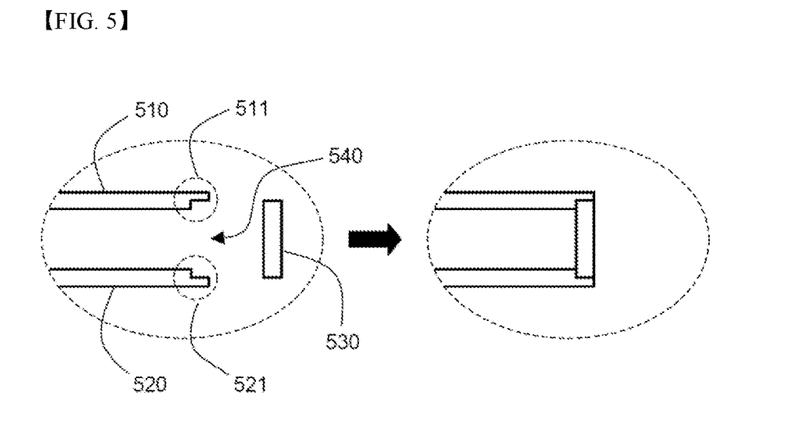
FIGS. 5 to 7 are typical views schematically showing various coupling structures between case members and cap plates of prismatic battery cells according to other embodiments of the present invention.
Figure 6:
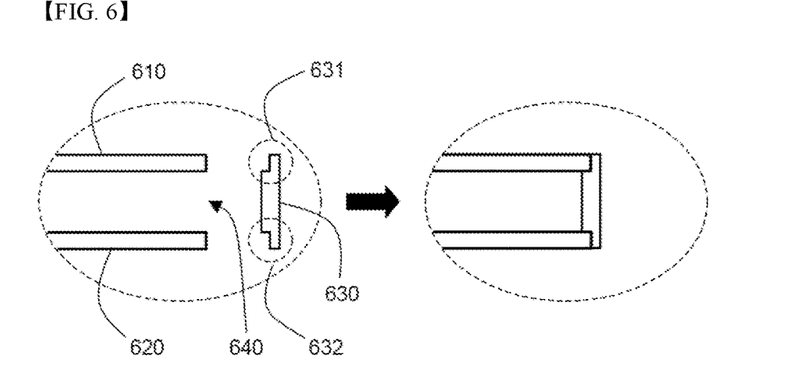
Figure 7:
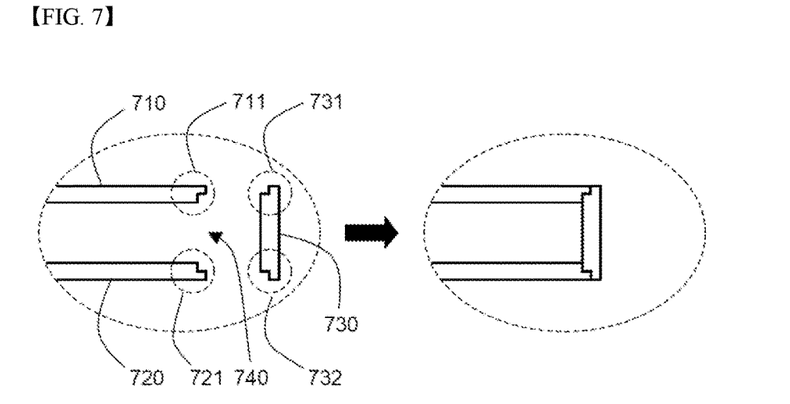

FIGS. 5 to 7 are typical views schematically showing various coupling structures between case members and cap plates of prismatic battery cells according to other embodiments of the present invention.

Referring first to FIG. 5, a cap plate 530 is coupled to an opening 540 of case members 510 and 520 in a sealed state.

Concave stair type steps 511 and 521 are formed at the opening 540 of the case members 510 and 520, to which the cap plate 530 is coupled. The cap plate 530, which is coupled to the opening 540, has no steps. The cap plate 530 has a size corresponding to the stair type steps 511 and 521.

Consequently, the cap plate 530 is inserted into the stair type steps 511 and 521, which are formed at the opening 540 of case members 510 and 520, in a sealed state.

Referring to FIG. 6, a cap plate 630, which is coupled to an opening 640 of case members 610 and 620, is provided at opposite ends thereof with stair type steps 631 and 632, and the opening 640 of the case members 610 and 620, to which the cap plate 630 is coupled, has no steps. The remaining coupling structure of FIG. 6 is identical to that of FIG. 5.

Referring to FIG. 7, stair type steps 711 and 721 are formed at an opening 740 of case members 710 and 720, to which a cap plate 730 is coupled, and the cap plate 730 is provided at opposite ends thereof with stair type steps 731 and 741, which correspond to the stair type steps 711 and 721. The remaining coupling structure of FIG. 7 is identical to that of FIG. 5.

FIGS. 8 to 15 are typical views schematically showing various structures of prismatic battery cells according to yet other embodiments of the present invention.

Figure 8:
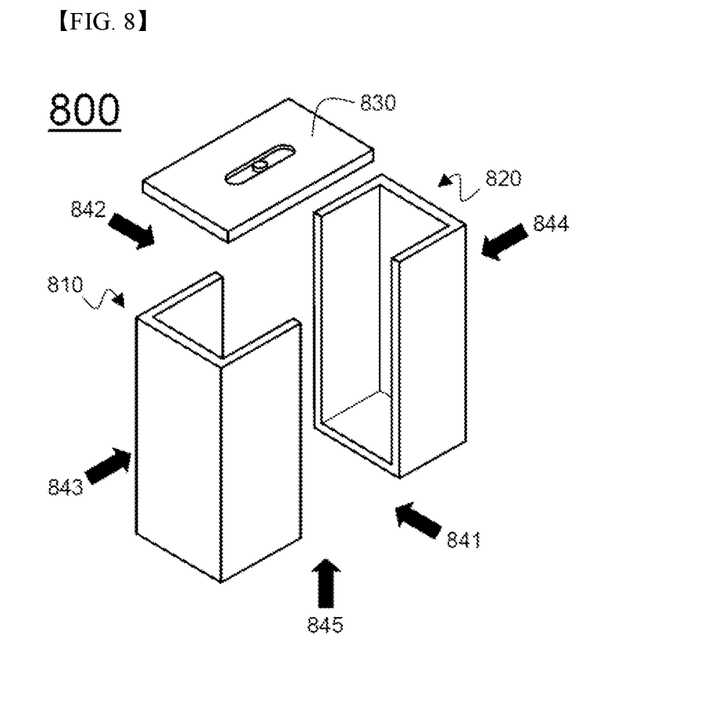
FIGS. 8 to 15 are typical views schematically showing various structures of prismatic battery cells according to yet other embodiments of the present invention.

Referring first to FIG. 8, a prismatic battery cell 800 includes two case members 810 and 820 and one cap plate 830.

The case members 810 and 820 entirely surround a left side surface 843 and a right side surface 844 of the prismatic battery cell 800, respectively. In addition, the case members 810 and 820 partially surround a front surface 841, a rear surface 842, and a lower end surface 845 of the prismatic battery cell 200. The remaining structure of the prismatic battery cell of FIG. 8 is identical to that of the prismatic battery cell of FIG. 2.

Figure 9:
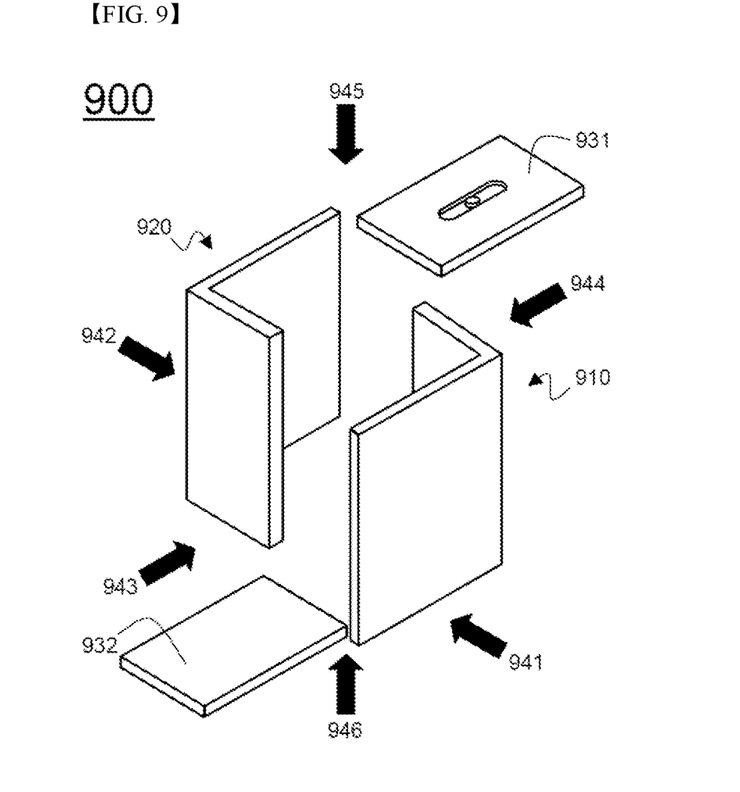

Referring to FIG. 9, a prismatic battery cell 900 includes two case members 910 and 920 and two cap plates 931 and 932.

The case members 910 and 920 have the same shape. The case members 910 and 920 are coupled to each other so as to have a shape corresponding to the external shape of an electrode assembly (not shown) such that the case members 910 and 920 surround the electrode assembly. When the case members 910 and 920 are coupled to each other, the case members 910 and 920 have predetermined openings, through which an upper end surface 945 and a lower end surface 946 of the prismatic battery cell 900 are exposed.

The case member 910 entirely surrounds a front surface 941 and a right side surface 944 of the prismatic battery cell 900, and the case member 920 entirely surrounds a rear surface 942 and a left side surface 943 of the prismatic battery cell 900.

The cap plates 931 and 932 are coupled respectively to the openings of the case members 910 and 920, which are formed by coupling between the case members 910 and 920, corresponding to the upper end surface 945 and the lower end surface 946 of the prismatic battery cell 900, in a sealed state.

Figure 10:
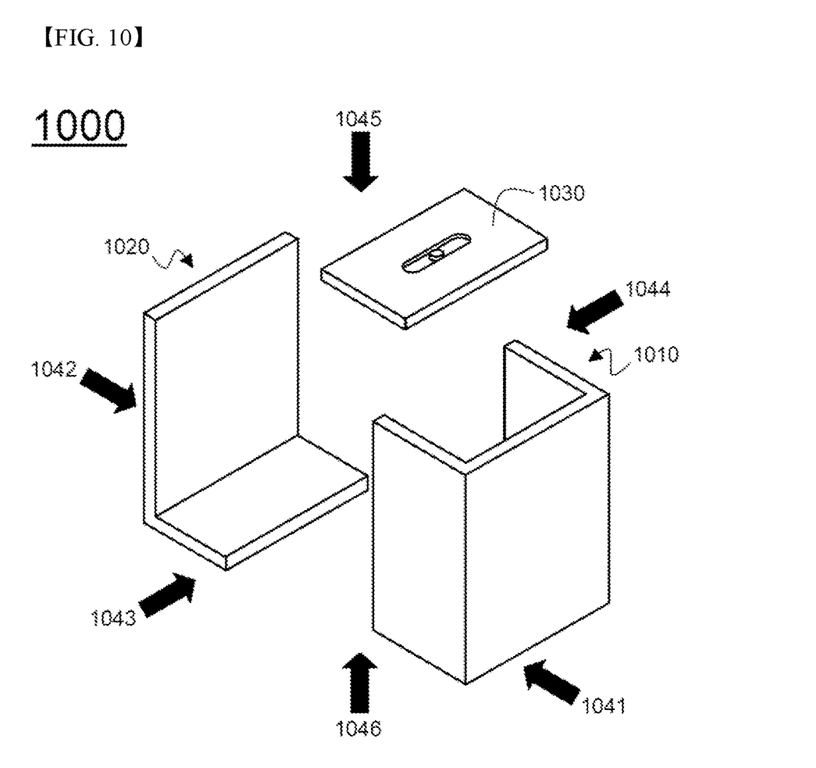

Referring to FIG. 10, a prismatic battery cell 1000 includes two case members 1010 and 1020 and one cap plate 1030.

The case members 1010 and 1020 have different shapes. The case members 1010 and 1020 are coupled to each other so as to have a shape corresponding to the external shape of an electrode assembly (not shown) such that the case members 1010 and 1020 surround the electrode assembly. When the case members 1010 and 1020 are coupled to each other, the case members 1010 and 1020 have a predetermined opening, through which an upper end surface 1045 of the prismatic battery cell 1000 is exposed.

The case member 1010 entirely surrounds a front surface 1041, a left side surface 1043, and a right side surface 1044 of the prismatic battery cell 1000, and the case member 1020 entirely surrounds a rear surface 1042 and a lower end surface 1046 of the prismatic battery cell 1000.

The cap plate 1030 is coupled to the opening of the case members 1010 and 1020, which is formed by coupling between the case members 1010 and 1020, corresponding to the upper end surface 1045 of the prismatic battery cell 1000, in a sealed state.

Figure 11:
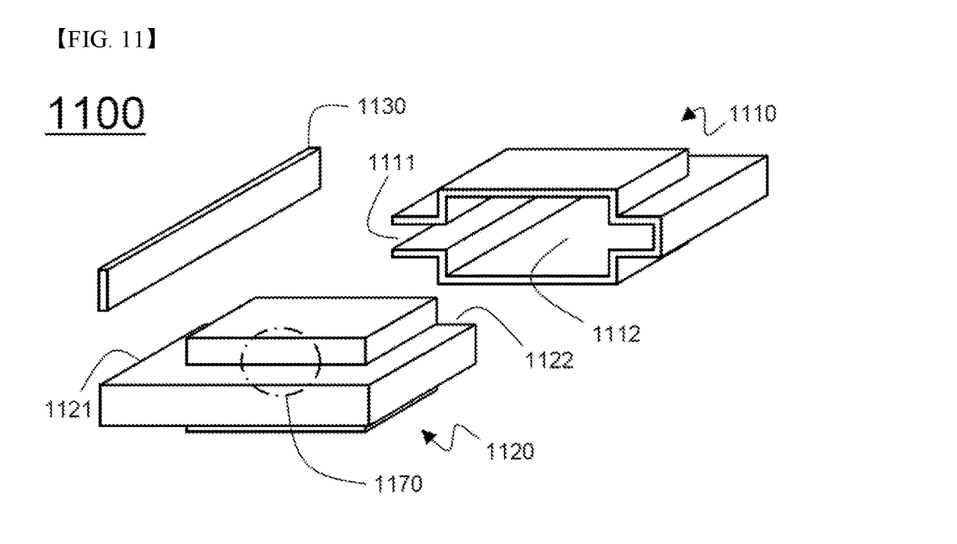

Referring to FIG. 11, a prismatic battery cell 1100 includes two case members 1110 and 1120 and one cap plate 1130.

The case members 1110 and 1120 have the same shape. Each of the case members 1110 and 1120 is formed to have a rectangular shape when viewed from above. The case members 1110 and 1120 are configured to have a structure in which first side surfaces 1111 and 1121, to which the cap plate 1130 is coupled, are open, and second side surfaces 1112 and 1122, which are adjacent to the first side surfaces 1111 and 1121, are also open.

The case members 1110 and 1120 are coupled to each other in a state in which the first side surfaces 1111 and 1121, to which the cap plate 1130 is coupled, are directed in the same direction, and the second side surfaces 1112 and 1122, which are open, face each other such that the case members 1110 and 1120 surround an electrode assembly (not shown).

When the case members 1110 and 1120 are coupled to each other, the case members 210 and 220 have a predetermined opening, through which first side surfaces 1111 and 1121 of the prismatic battery cell 1100 are exposed.

The cap plate 1130 is coupled to the opening of the case members 1110 and 1120, which is formed by coupling between the case members 1110 and 1120, in a sealed state.

When the case members 1110 and 1120 are coupled to each other, the case members 1110 and 1120 have a shape corresponding to the external shape of the electrode assembly. Each of the case members 1110 and 1120 is provided at the outer edge thereof with a stair type step 1170.

Figure 12:
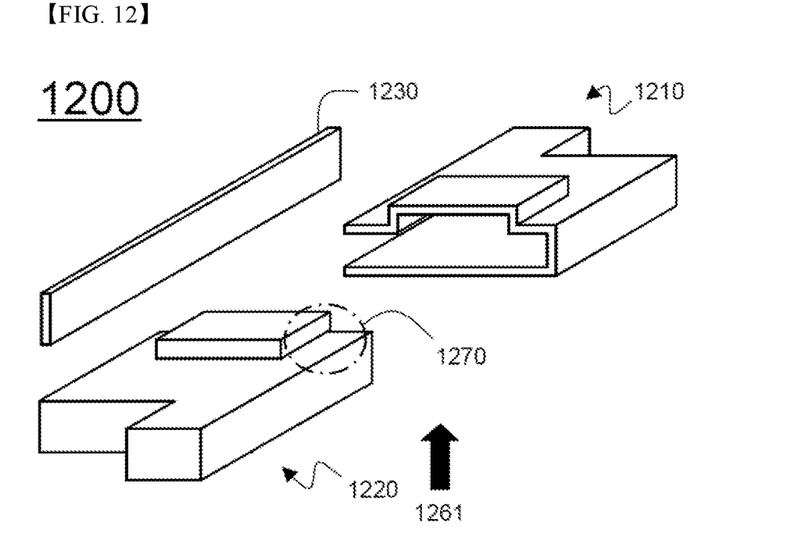

Referring to FIG. 12, a prismatic battery cell 1200 includes two case members 1210 and 1220 and one cap plate 1230.

Each of the case members 1210 and 1220 is formed to have a polygonal shape when viewed from above, and a stair type step 1270 is not formed at each of the case members 1210 and 1220 when viewed from below as indicated by an arrow 1261. The remaining structure of the prismatic battery cell of FIG. 12 is identical to that of the prismatic battery cell 1100 of FIG. 11, and a detailed description thereof will be omitted.

Figure 13:
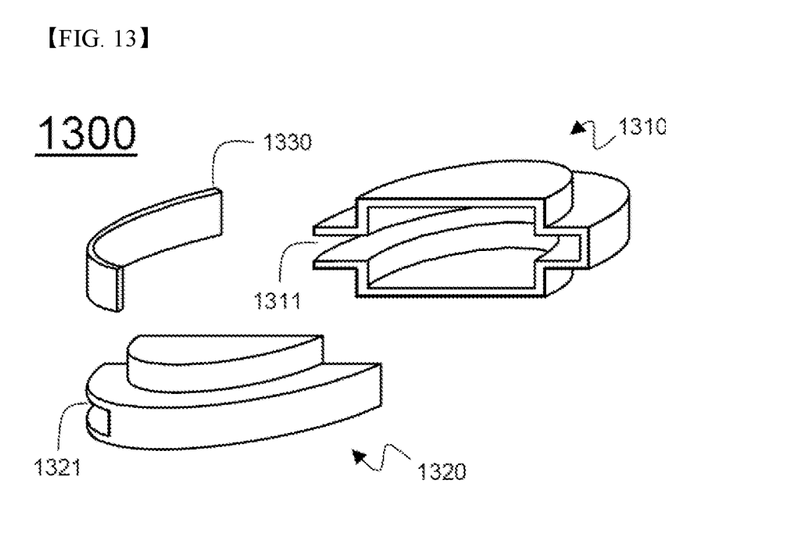

Referring to FIG. 13, a prismatic battery cell 1300 includes two case members 1310 and 1320 and one cap plate 1330.

The case members 1310 and 1320 have the same shape. Each of the case members 1310 and 1320 is formed to have a semicircular shape when viewed from above. The case members 1310 and 1320 are configured to have a structure in which first side surfaces 1311 and 1321 are partially open, and the cap plate 1330 is coupled to the opening of the case members 1310 and 1320 in a sealed state. The remaining structure of the prismatic battery cell of FIG. 13 is identical to that of the prismatic battery cell 1200 of FIG. 12, and a detailed description thereof will be omitted.

Figure 14:
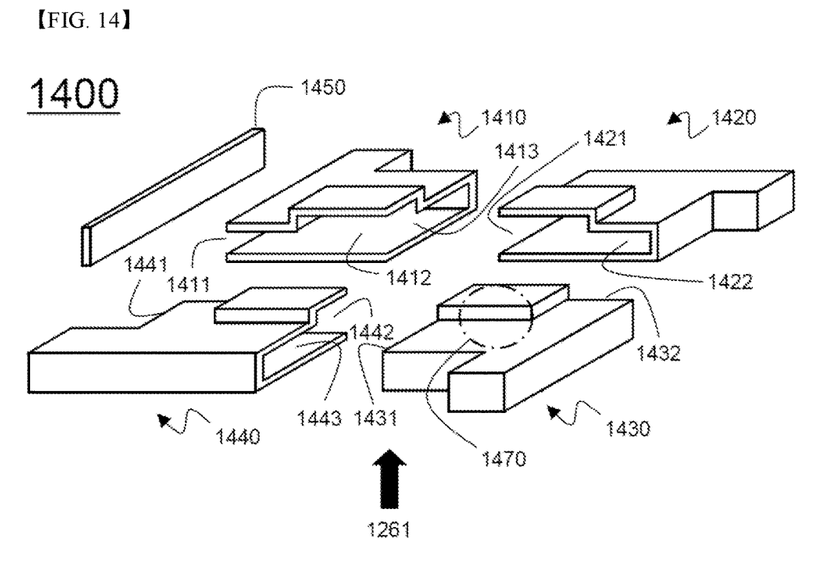

Referring to FIG. 14, a prismatic battery cell 1400 includes four case members 1410, 1420, 1430, and 1440 and one cap plate 1450.

The first case member 1410 and the fourth case member 1440 are configured to have a structure in which first side surfaces 1441 and 1441, to which the cap plate 1450 is coupled, second side surfaces 1412 and 1442, which face each other in a state of being adjacent to the first side surfaces 1441 and 1441, and third side surfaces 1413 and 1443, which face the second case member 1420 and the third case member 1430, respectively, in a state of being opposite to the first side surfaces 1441 and 1441, are open.

The second case member 1420 and the third case member 1430 are configured to have a structure in which second side surfaces 1422 and 1432, which face each other, and first side surfaces 1421 and 1431, which face the first case member 1410 and the fourth case member 1440, respectively, are open.

The prismatic battery cell 1400 is provided at the outer surfaces thereof excluding the bottom surface with stair type steps 1470 corresponding to the external shape of an electrode assembly (not shown).

Figure 15:
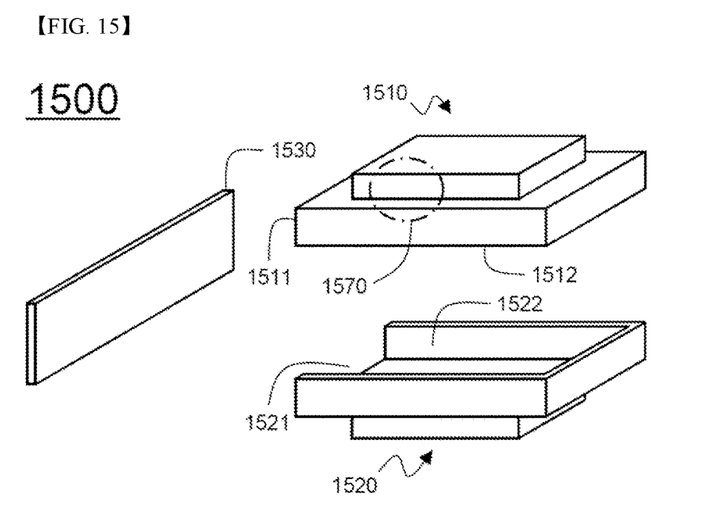

Referring to FIG. 15, a prismatic battery cell 1500 includes two case members 1510 and 1520 and one cap plate 1530.

Each of the case members 1510 and 1520 is formed to have a rectangular shape when viewed from above. The case members 1510 and 1520 are configured to have a structure in which first side surfaces 1511 and 1521, to which the cap plate 1530 is coupled, and a top surface 1522 and a bottom surface 1512, which face each other, are open.

The case members 1510 and 1520 have stair type steps 1470 corresponding to the external shape of an electrode assembly (not shown). The case members 1510 and 1520 are coupled to each other in a state in which the top surface 1522 and the bottom surface 1512 face each other. The cap plate 1530 is coupled to the opening formed by the first side surfaces 1511 and 1521, which are open, in a sealed state.

As can be seen from the above embodiments, the prismatic battery cell according to the present invention includes two or more case members, which are coupled to each other so as to have a shape corresponding to the external shape of the electrode assembly such that the case members surround the electrode assembly, and one or more cap plates. Consequently, it is possible to easily configure an assembly having various shapes, such as stair type steps, and, at the same time, to improve the safety of the prismatic battery cell against external physical impact.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a prismatic battery cell according to the present invention is configured such that a battery case is constituted by two or more case members, coupled to each other so as to surround an electrode assembly in response to the external shape of the electrode assembly, and a cap plate. Consequently, it is possible to improve overall rigidity of a battery cell, to improve the safety of the battery cell against external physical impact, and to prevent the battery cell from being deformed due to gas generated in the battery cell, whereby it is possible to improve the safety of the battery cell and a device, to which the battery cell is applied, to variously design the battery cell without limitations in shape, to reduce cost and time necessary to manufacture the battery cell, thereby improving production efficiency and reducing a product defect rate.

The invention claimed is:

1. A prismatic battery cell comprising:
an electrode assembly comprising a positive electrode, a negative electrode, and a separator disposed between the positive electrode and the negative electrode, the electrode assembly having a positive electrode terminal and a negative electrode terminal protruding from at least one side of the positive electrode and the negative electrode, wherein the electrode assembly includes a step formed on an outer surface thereof;
two or more case members coupled to each other so as to have a shape corresponding to an external shape of the electrode assembly such that the case members surround the electrode assembly, the case members having a predetermined opening, through which one surface of the electrode assembly corresponding to protruding portions of the positive electrode terminal and the negative electrode terminal is exposed; and
a cap plate coupled to the opening of the case members in a sealed state,
wherein a first case member of the two or more case members includes a first step coupling portion, a second case member of the two or more case members includes a second step coupling portion, and an outer surface of the first step coupling portion and an inner surface of the second step coupling portion are directly coupled to each other,
wherein the case members include a step in at least one outer surface thereof, and
wherein the step of the case members is formed to correspond to the step of the electrode assembly, and
wherein the positive electrode terminal and the negative electrode terminal are electrically connected to the cap plate in the sealed state.

2. The prismatic battery cell according to claim 1, wherein the electrode assembly is configured to have a structure in which unit cells, each of which is configured to have a stacked structure comprising a positive electrode, a negative electrode, and a separator disposed between the positive electrode and the negative electrode, are successively folded using a separation film.

3. The prismatic battery cell according to claim 1, wherein the positive electrode terminal and the negative electrode terminal protrude from the same side of the electrode assembly.

4. The prismatic battery cell according to claim 3, wherein the case members are coupled to each other so as to have a structure in which the case members surround the other surfaces of the electrode assembly such that the case members have one opening, through which one surface of the electrode assembly corresponding to the protruding portions of the positive electrode terminal and the negative electrode terminal are exposed.

5. The prismatic battery cell according to claim 3, wherein the case members are coupled to each other so as to have a structure in which the case members surround the other surfaces of the electrode assembly such that the case members have two openings, through which one surface of the electrode assembly corresponding to the protruding portions of the positive electrode terminal and the negative electrode terminal and another surface of the electrode assembly opposite to one surface of the electrode assembly are exposed.

6. The prismatic battery cell according to claim 4, wherein the cap plate is coupled to the opening or each opening of the case members, and the cap plate coupled to one surface of the electrode assembly corresponding to the protruding portions of the positive electrode terminal and the negative electrode terminal is electrically connected to the positive electrode terminal and the negative electrode terminal of the electrode assembly.

7. The prismatic battery cell according to claim 1, wherein the case members are two case members having the same shape.

8. The prismatic battery cell according to claim 1, wherein the case members are two case members having different shapes.

9. The prismatic battery cell according to claim 1, wherein each of the case members is manufactured by forging, blanking, or cutting a metal sheet.

10. The prismatic battery cell according to claim 1, wherein cap-coupling portions are formed in the case members or in the cap plate.

11. The prismatic battery cell according to claim 1, wherein the case members include concave cap-coupling portions coupled to the cap plate, or the cap plate includes convex cap-coupling portions coupled to the case members.

12. The prismatic battery cell according to claim 1, wherein the case members include concave cap-coupling portions coupled to the cap plate, and the cap plate includes convex cap-coupling portions coupled to the case members.

13. The prismatic battery cell according to claim 10, wherein the cap-coupling portions are configured to engage with each other.

14. The prismatic battery cell according to claim 1, wherein coupling between the case members and coupling between the case members and the cap plate are achieved by laser welding.

15. The prismatic battery cell according to claim 1, wherein the prismatic battery cell is configured to have a structure in which the case members are coupled to each other so as to surround the other surfaces of the electrode assembly in the sealed state in which the positive electrode terminal and the negative electrode terminal of the electrode assembly are electrically connected to the cap plate.

16. The prismatic battery cell according to claim 15, wherein prismatic battery cell is a lithium secondary battery.

17. A device comprising one or more prismatic battery cells according to claim 1.

18. The device according to claim 17, wherein the device is selected from a group consisting of a mobile phone, a tablet computer, a laptop computer, a power tool, a wearable electronic device, an electric vehicle, a hybrid electric vehicle, a plug-in hybrid electric vehicle, and a power storage apparatus.

19. A method of manufacturing a prismatic battery cell according to claim 1, the method comprising:

(a) preparing unit cells, each of which is configured to have a stacked structure comprising at least one positive electrode, at least one negative electrode, and at least one separator disposed between the at least one positive electrode and the at least one negative electrode;

(b) sequentially folding the unit cells prepared at step (a) in a state in which the unit cells are placed on a long sheet type separation film to prepare an electrode assembly;

(c) electrically connecting a positive electrode terminal and a negative electrode terminal of the electrode assembly prepared at step (b) to a cap plate; and (d) coupling case members and the cap plate so as to surround the electrode assembly, the positive electrode terminal and the negative electrode terminal of which are electrically connected to the cap plate at step (c), injecting an electrolyte into the case members, and sealing the case members.

20. The method according to claim 19, wherein the unit cells are configured such that outermost electrodes of the unit cells having different polarities face each other in a state in which the separation film is disposed between the outermost electrodes of the unit cells.

21. The method according to claim 19, wherein coupling between the case members and coupling between the case members and the cap plate are achieved by laser welding.

22. The method according to claim 19, wherein step (d) comprises injecting the electrolyte into the case members through an electrolyte injection hole formed in the cap plate.

* * * * *